United States Patent
Gu

(10) Patent No.: US 11,498,637 B2
(45) Date of Patent: Nov. 15, 2022

(54) ARMREST HANDLEBAR AND BICYCLE HANDLEBAR ASSEMBLY HAVING THE SAME

(71) Applicant: TIEN HSIN INDUSTRIES CO., LTD., Taichung (TW)

(72) Inventor: Fong-Syuan Gu, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 430 days.

(21) Appl. No.: 16/780,454

(22) Filed: Feb. 3, 2020

(65) Prior Publication Data

US 2021/0237825 A1 Aug. 5, 2021

(51) Int. Cl.
*B62K 21/12* (2006.01)
*B62K 3/02* (2006.01)
*B62K 21/16* (2006.01)

(52) U.S. Cl.
CPC .............. *B62K 21/125* (2013.01); *B62K 3/02* (2013.01); *B62K 21/16* (2013.01)

(58) Field of Classification Search
CPC ...... B62K 21/125; B62K 21/12; B62K 21/16; B62K 3/02
See application file for complete search history.

(56) References Cited

U.S. PATENT DOCUMENTS 5,197,350 A * 3/1993 Borromeo ............ B62K 21/125
74/551.8
10,160,510 B1 * 12/2018 Salazar ................ B62K 21/125

2012/0001402 A1 * 1/2012 Weber ................ B62K 21/125
74/551.8
2016/0129961 A1 * 5/2016 Hed ..................... B62K 21/125
224/414

FOREIGN PATENT DOCUMENTS

| CN | 208149530 U | 11/2018 |
| TW | M384814 U | 7/2010 |
| TW | M393416 U | 12/2010 |

(Continued)

OTHER PUBLICATIONS

Search report for TW108142970, dated Aug. 24, 2020, Total of 1 page.

(Continued)

*Primary Examiner* — Luis A Gonzalez
(74) *Attorney, Agent, or Firm* — Apex Juris, PLLC; Hilde Coeckx

(57) ABSTRACT

An armrest handlebar and a bicycle handlebar assembly having the armrest handlebar are disclosed. The bicycle handlebar assembly includes a steering handlebar, the armrest handlebar, and two armrest pads. The steering handlebar is pivotally engaged with a frame. The armrest handlebar includes two extending tubes which are engaged with the steering handlebar. Each of the extending tubes includes a combining segment, a lifting segment, a leaned segment, and a holding segment which are sequentially disposed. The lifting segment is raised above the combining segment at a first angle, and the leaned segment is raised above the combining segment at a second angle. A curved surface is formed by recessing from a top surface of each of the leaned segments. Each of the two armrest pads is engaged with the steering handlebar and has a concave surface for a rider to lean on.

30 Claims, 6 Drawing Sheets

(56) References Cited

FOREIGN PATENT DOCUMENTS

TW          M436027 U     8/2012
TW          M483914 U     8/2014

OTHER PUBLICATIONS

English abstract for TWM483914, Total of 1 page.
English abstract for TWM436027, Total of 1 page.
English abstract for TWM393416, Total of 1 page.
English abstract for TWM384814, Total of 1 page.
English abstract for CN208149530, Total of 1 page.

\* cited by examiner

ARMREST HANDLEBAR AND BICYCLE HANDLEBAR ASSEMBLY HAVING THE SAME

BACKGROUND OF THE INVENTION

Technical Field

The present disclosure relates generally to a bicycle, and more particularly to an armrest handlebar and a bicycle handlebar assembly having the armrest handlebar.

Description of Related Art

In recent years, an awareness of energy conservation and carbon emissions reduction is raised, so that riding a bicycle become more and more popular in the field of competitions, sports, transportations, and so on. In order to improve a riding efficiency in a long-distance competition or a long-distance cycling sport, most of the bicycles are disposed with an assistive operating device, such as an armrest handlebar or an armrest pad mounted on a steering handlebar, thereby to allow a rider to rest their arm on the armrest handlebar, the armrest pad, or other assistive operative device to support a portion of the body weight, so that the rider could have better physical energy during the long-distances competition or the long-distance cycling sport.

In general, a conventional armrest handlebar is commonly in round-tube shaped, which includes a straight section and an uplifted bending section for the rider to rest and to grip. However, said armrest handlebar doesn't conform to the ergonomics of arm position during cycling and to an arm shape. Therefore, when the rider rests their arms on the conventional armrest handlebar for a long period of time, the rider may easily feel tired or uncomfortable, so the conventional armrest handlebar cannot fulfill a need of the rider. Thus, the conventional armrest handlebar still has room for improvement.

BRIEF SUMMARY OF THE INVENTION

In view of the above, the primary objective of the present disclosure is to provide an armrest handlebar and a bicycle handlebar assembly having the armrest handlebar for improving comfortability when a user rests arms on the armrest handlebar.

The inventive subject matter provides an armrest handlebar includes two extending tubes, and each of the two extending tubes comprises a combining segment, a lifting segment, a leaned segment, and a holding segment which are sequentially disposed wherein the combining segment has a base axis and is adapted to be connected to the steering handlebar. The holding segment has a third center axis. A first angle is formed between the first center axis and the base axis. A second angle is formed between the second center axis and the base axis, wherein the first angle is greater than the second angle.

Since the lifting segment is lifted at the first angle relative to the combining segment, and the leaned segment is lifted at the second angle relative to the combining segment, the rider could keep a more comfortable riding position when the rider rests arms on the armrest handlebar.

The inventive subject matter further provides a bicycle handlebar assembly includes a steering handlebar, an armrest handlebar, and two armrest pads. The steering handlebar is adapted to be pivotally engaged with a frame of a bicycle. The armrest handlebar includes two extending tubes connected to the steering handlebar, wherein each of the two extending tubes comprises a combining segment, a lifting segment, a leaned segment, and a holding segment which are sequentially disposed. The combining segment has a base axis and is connected to the steering handlebar. The lifting segment is connected to the combining segment at an elevation angle. The leaned segment is connected to the lifting segment. The holding segment is adapted to be held by a rider. A top surface of each of the leaned segments is recessed to form a curved surface adapted to be leaned on by a forearm of the rider. The two armrest pads which are engaged with the steering handlebar, wherein each of the armrest pads has a concave surface. A sagittal plane passing through the pivot axis of the steering handlebar and a coronal plane contain passing through the pivot axis of the steering handlebar are defined. When the armrest handlebar is projected onto the coronal plane, the curved surface of each of the leaned segments of the two extending tubes has an inner extreme point and an outer extreme point on the coronal plane. The inner extreme point is lower than the outer extreme point. The inner extreme point is closer to the sagittal plane than the outer extreme point. When the armrest handlebar is projected onto the coronal plane, the concave surface of each of the two armrest pads has a near side extreme point and a far side extreme point on the coronal plane. The near side extreme point is closer to the sagittal plane than the far side extreme point. A first extending line passes through the inner extreme point and the outer extreme point. A second extending line passes through the near side extreme point and the far side extreme point. An angle formed between the first extending line and the second extending line is an acute angle.

The bicycle handlebar assembly having the armrest handlebar according to the present disclosure includes the curved surface of each of the extending tubes, wherein when the rider rests the arms on the armrest handlebar, the arms of the rider could be fitted in the curved surfaces, thereby to alleviate a problem that the arms of the rider are not fitted in the conventional round-tube shaped armrest handlebar.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
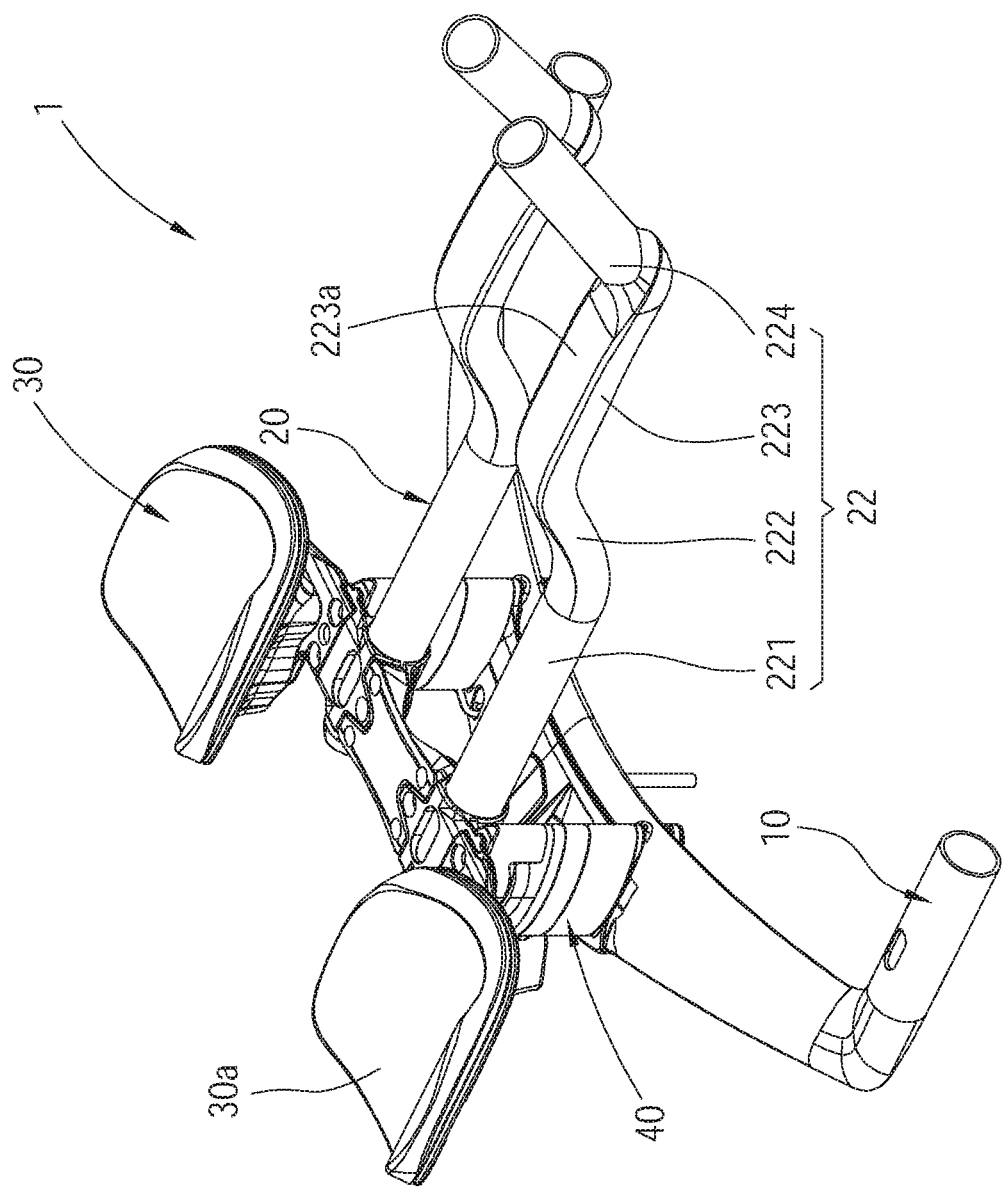
FIG. 1 is a perspective view of the bicycle handlebar assembly of an embodiment according to the present disclosure.
Figure 2:
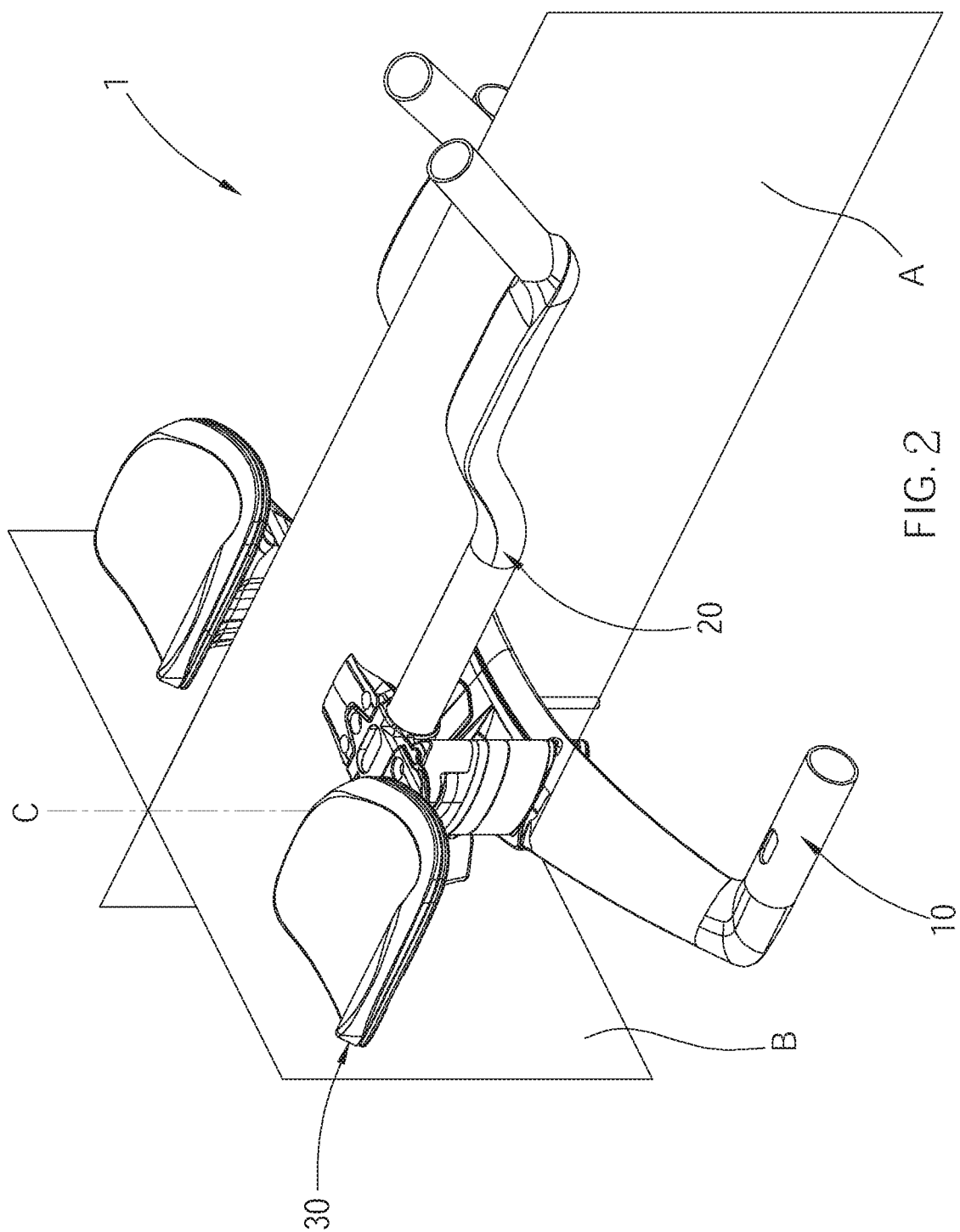
FIG. 2 is a perspective view of the bicycle handlebar assembly of an embodiment according to the present disclosure, showing the sagittal plane, the coronal plane, and the pivot axis.
Figure 3:
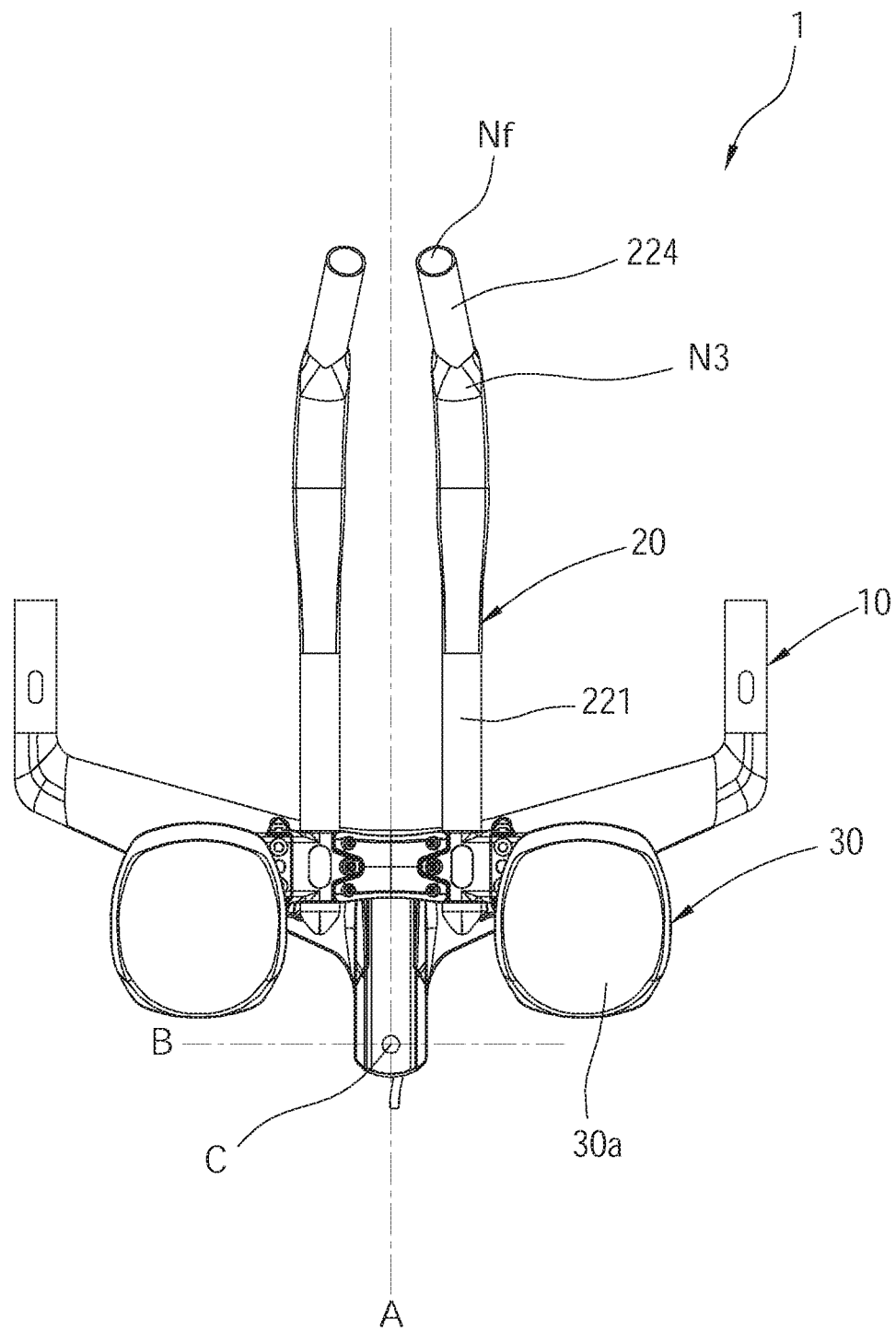
FIG. 3 is a top view of the bicycle handlebar assembly shown in FIG. 1.

As illustrated in FIG. 1 to FIG. 4, a bicycle handlebar assembly 1 of an embodiment according to the present disclosure includes a steering handlebar 10, an armrest handlebar 20, and two armrest pads 30, wherein the steering handlebar 10 is engaged with a frame (not shown) of a bicycle and is able to pivot around a pivot axis C relative to the frame. Besides, a sagittal plane A and a coronal plane B contain the pivot axis C of the steering handlebar 10, and the sagittal plane A is perpendicular to the coronal plane B. The armrest handlebar 20 and the two armrest pads 30 are symmetrically disposed on two lateral sides of the sagittal plane A.

The armrest handlebar 20 includes two extending tubes 22 which are connected to the steering handlebar 10 respectively. Each of the extending tubes 22 includes a combining segment 221, a lifting segment 222, a leaned segment 223, and a holding segment 224 which are sequentially disposed, wherein the combining segment 221 has a base axis La and is connected to the steering handlebar 10. The lifting segment 222 is connected to the combining segment 221 at an elevation angle. The leaned segment 223 is connected to the lifting segment 222. The holding segment 224 is connected to the leaned segment 223 and is adapted to be held by a bicycle rider, wherein a top surface of the leaned segment 223 is recessed to form a curved surface 223a adapted to be leaned on by a forearm of the rider, so that the forearm of the rider could stably and comfortably lean against the curved surface 223a to improve a problem that the arm of the rider is not fitted in the conventional round-tube shaped armrest handlebar. In other embodiments, the top surface of the leaned segment could be a flat surface which could solve the problem that an arm of the rider is not fitted in the conventional round-tube shaped armrest handlebar as well.

Figure 4:
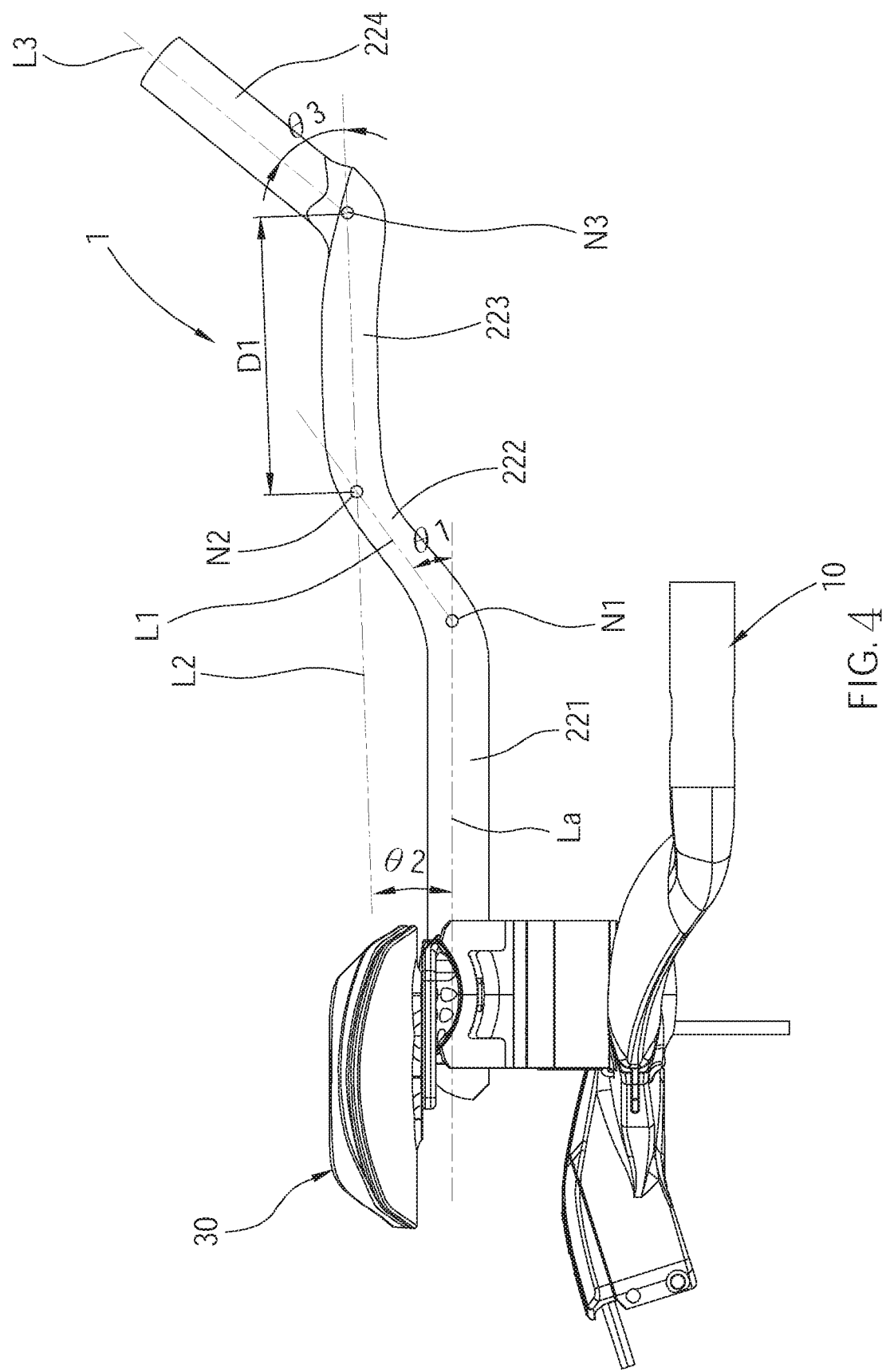
FIG. 4 is a side view of the bicycle handlebar assembly shown in FIG. 1

Referring to FIG. 4, the lifting segment 222 has a first center axis L1; the leaned segment 223 has a second center axis L2; the holding segment 224 has a third center axis L3. The base axis La and the first center axis L1 cross each other at a first node N1. The first center axis L1 and the second center axis L2 cross each other at a second node N2. The second center axis L2 and the third center axis L3 cross each other at a third node N3. A first angle $\theta 1$ is formed between the first center axis L1 and the base axis La of the combining segment 221. A second angle $\theta 2$ is formed between the second center axis L2 and the base axis La of the combining segment 221, wherein the first angle $\theta 1$ is greater than the second angle $\theta 2$, so that the rider could keep a more comfortable riding position when the rider rests the arm on the armrest handlebar 20. It is worthy to mention that a length D1 between the second node N2 and third node N3 is in a range from 5 cm to 20 cm (i.e., 5 cm≤D1≤20 cm). In an embodiment, the length D1 between the second node N2 and the third node N3 is in a range from 8 cm to 16 cm (i.e., 8 cm≤D1≤16 cm). Preferably, the length D1 between the second node N2 and third node N3 is 12 cm. In the current embodiment, the combining segment 221 is horizontal. In other embodiments, the combining segment could tilt upward or downward relative to a horizontal plane at an angle.

In the current embodiment, an end of the holding segment 224 of each of the extending tubes 22 is connected to the leaned segment 223, and another end of the holding segment 224 is a free end Nf. The third center axis L3 passes through the third node N3 and the free end Nf. An elevation angle $\theta 3$ is formed between the third center axis L3 and the second center axis L2, wherein the elevation angle $\theta 3$ between the third center axis L3 and the second center axis L2 is in a range from 0 degrees to 90 degrees (i.e., 0°≤$\theta 3$≤90°). In other words, the holding segment 224 is tilted upward for being held by a hand of the rider. It is worthy to mention that the holding segment 224 is formed by extending from the third node N3 to the free end Nf, and a distance between the free end Nf and the sagittal plane A is smaller than a distance between the third node N3 and the sagittal plane A (i.e., the free end Nf is closer to the sagittal plane A than the third node N3). In other words, the two holding segments 224 are not parallelly disposed.

Figure 5:
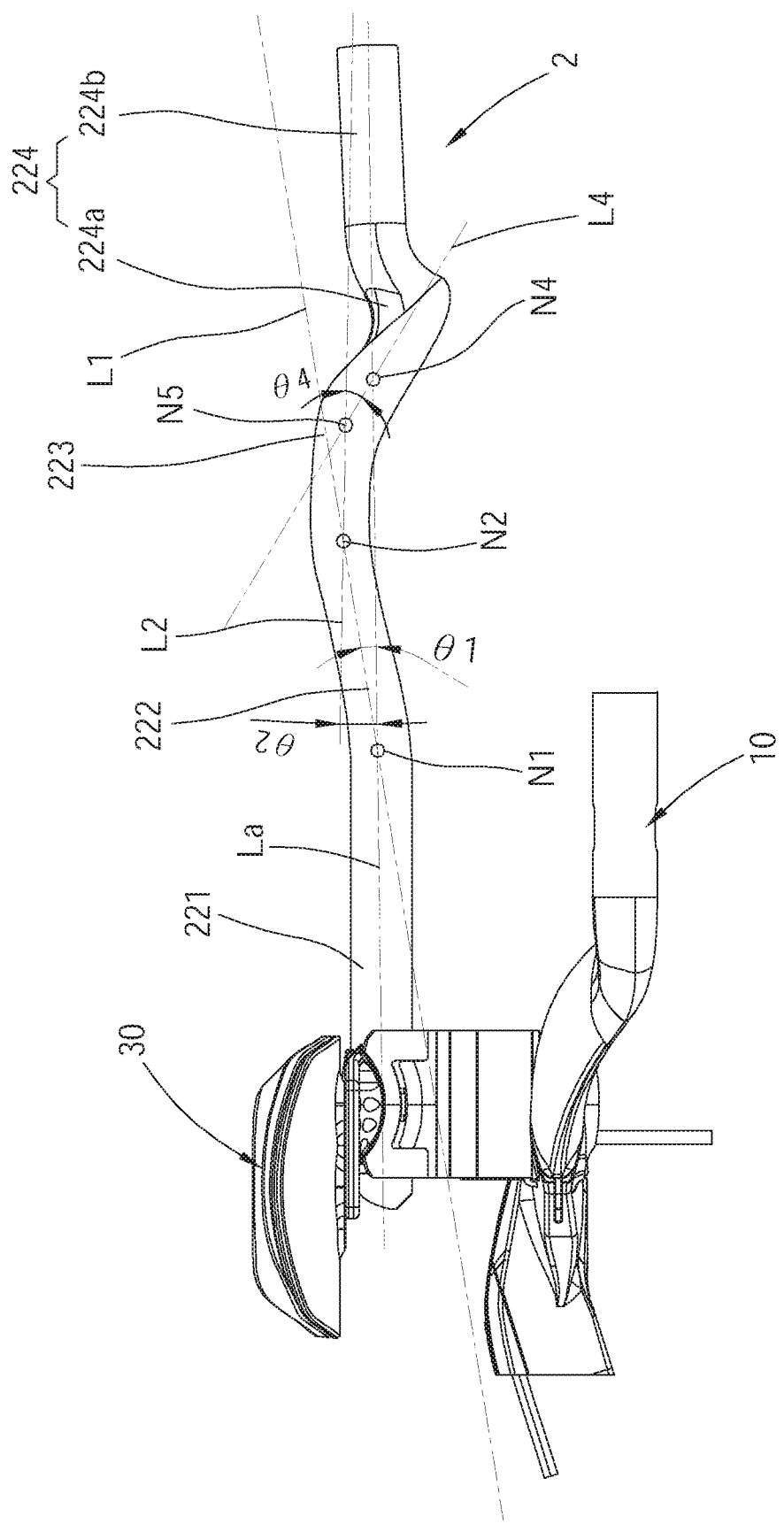
FIG. 5 is a side view of the bicycle handlebar assembly of another embodiment according to the present disclosure.

A bicycle handlebar assembly 2 of another embodiment according to the present disclosure is illustrated in FIG. 5, the holding segment 224 of the bicycle handlebar assembly 2 could be tilted downward relative to the leaned segment 223 for being held by the hand of the rider. The holding segment 224 of the armrest handlebar 20 further includes a bending portion 224a and an extending portion 224b, wherein an end of the bending portion 224a is connected to the leaned segment 223, and another end of the bending portion 224a is connected to the extending portion 224b. The extending portion 224b is formed by extending in a direction away from the bending portion 224a, and a height difference is formed between the extending portion 224b and the leaned segment 223. The bending portion 224a has a fourth center axis L4. A depression angle $\theta 4$ is formed between the fourth center axis L4 and the second center axis L2, wherein the depression angle $\theta 4$ is an acute angle. Preferably, the depression angle $\theta 4$ is in a range between 0 degrees to 60 degrees (i.e., 0°≤$\theta 4$≤60°). The fourth center axis L4 intersects with the second center axis L2 at a fifth node N5 and intersects with the base axis La at a fourth node N4. A distance between the fourth node N4 and the fifth node N5 is smaller than or equal to 10 cm, so that the rider could easily hold it by the hand.

Figure 6:
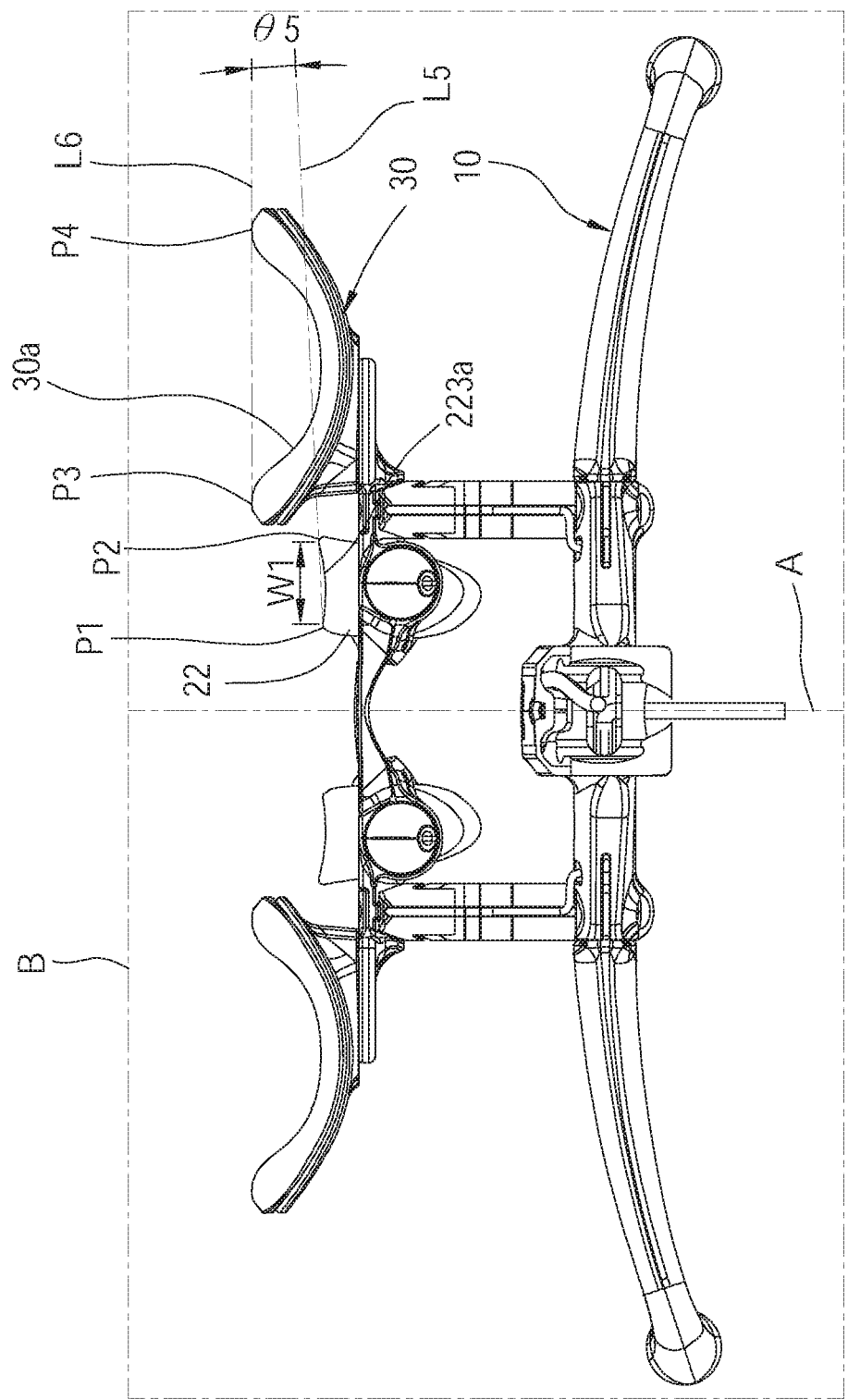
FIG. 6 is a schematic diagram, showing the orthographic projection of the bicycle handlebar assembly shown in FIG. 1 on the coronal plane.

Referring to FIG. 6 which illustrates that the bicycle handlebar assembly 1 of the embodiment of the present disclosure is projected onto the coronal plane B, the curved surface 223a of the leaned segment 223 of each of the extending tubes 22 projected onto the coronal plane B has an inner extreme point P1 and an outer extreme point P2 on the coronal plane B, wherein the inner extreme point P1 of each of the curved surfaces 223a is closer to the sagittal plane A than the outer extreme point P2. Besides, the inner extreme point P1 of each of the curved surfaces 223a is located lower than the outer extreme point P2. In the current embodiment, a distance W1 between the inner extreme point P1 and the outer extreme point P2 is in a range between 2 cm and 6 cm (i.e., 2 cm≤W1≤6 cm). In an embodiment, the distance W1 between the inner extreme point P1 and the outer extreme point P2 is in a range between 3 cm and 5 cm (i.e., 3 cm≤W1≤5 cm). Preferably, the distance W1 between the inner extreme point P1 and the outer extreme point P2 is 4 cm. Each of the two armrest pads 30 is engaged with the steering handlebar 10 and has a concave surface 30a. Each of the concave surfaces 30a projected onto the coronal plane B has a near side extreme point P3 and a far side extreme point P4 on the coronal plane B, wherein the near side extreme point P3 is closer to the sagittal plane A than the far side extreme point P4. A first extending line L5 passes through the inner extreme point P1 and the outer extreme point P2, and a second extending line L6 passes through the near side extreme point P3 and the far side extreme point P4. An angle $\theta 5$ formed between the first extending line L5 and the second extending line L6 is an acute angle. In the current embodiment, the angle $\theta 5$ between the first extending line L5 and the second extending line L6 is in a range from 0 degrees to 45 degrees (i.e., 0°≤$\theta 5$≤45°). In an embodiment, the angle $\theta 5$ between the first extending line L5 and the second extending line L6 is in a range from 0 degrees to 30 degrees (i.e., 0°≤$\theta 5$≤30°). Preferably, the angle $\theta 5$ between the first extending line L5 and the second extending line L6 is in a range from 0 degrees to 15 degrees (i.e., 0°≤θ5≤15°). In the current embodiment, the second extending line L6 is parallel to the base axis La and is parallel to the horizontal plane. In practice, the second extending line L6 could be not parallel to the horizontal plane.

It is worthy to mention that in the embodiment according to the present disclosure, the bicycle handlebar assembly 1 further includes a connecting seat 40 connected to the steering handlebar 10, and the connecting seat 40 is connected to the armrest handlebar 20 and the two armrest pads 30, so that both of the armrest handlebar 20 and the two armrest pads 30 are connected to the steering handlebar 10 via the connecting seat 40. In other embodiments, the steering handlebar 10, the armrest handlebar 20, and the armrest pads 30 could be, but not limited to, integrally formed as a monolithic unit.

It must be pointed out that the embodiment described above is only a preferred embodiment of the present disclosure. All equivalent structures which employ the concepts disclosed in this specification and the appended claims should fall within the scope of the present disclosure.

What is claimed is:

1. An armrest handlebar which is adapted to be engaged with a steering handlebar of a bicycle, wherein the steering handlebar is pivotable to pivot around a pivot axis; the armrest handlebar comprises:
    two extending tubes, and each of the two extending tubes comprises a combining segment, a lifting segment, a leaned segment, and a holding segment which are sequentially disposed, wherein the combining segment has a base axis and is adapted to be connected to the steering handlebar; the holding segment is adapted to be held by a hand of a rider; the lifting segment has a first center axis; the leaned segment has a second center axis; the holding segment has a third center axis; a first angle is formed between the first center axis and the base axis; a second angle is formed between the second center axis and the base axis, wherein the first angle is greater than the second angle;
    wherein the base axis intersects with the first center axis at a first node; the first center axis intersects with the second center axis at a second node; the second center axis intersects with the third center axis at a third node; and
    wherein a length between the second node and the third node is greater than or equal to 5 cm and is smaller than or equal to 20 cm.

2. The armrest handlebar of claim 1, wherein a sagittal plane passing through the pivot axis of the steering handlebar is defined; each of the holding segments of the two extending tubes has a free end; a distance between the free end and the sagittal plane is smaller than a distance between the third node and the sagittal plane.

3. The armrest handlebar of claim 2, wherein the third center axis passes through the third node and the free end; an elevation angle is formed between the third center axis and the second center axis and is greater than 0 degrees and is smaller than or equal to 90 degrees.

4. The armrest handlebar of claim 1, wherein the length between the second node and the third node is greater than or equal to 8 cm and is smaller than or equal to 16 cm.

5. The armrest handlebar of claim 1, wherein each of the holding segments comprises a bending portion and an extending portion; the bending portion has a fourth center axis; a depression angle is formed between the fourth center axis and the second center axis and is an acute angle.

6. The armrest handlebar of claim 5, wherein the depression angle is greater than 0 degrees and is smaller than or equal to 60 degrees.

7. The armrest handlebar of claim 6, wherein the fourth center axis intersects with the second center axis at a fifth node; the fourth center axis intersects with the base axis at a fourth node, and a distance between the fourth node and the fifth node is smaller than or equal to 10 cm.

8. The armrest handlebar of claim 1, wherein a top surface of each of the leaned segments of the two extending tubes is recessed to form a curved surface adapted to be leaned on by a forearm of the rider.

9. The armrest handlebar of claim 8, wherein a sagittal plane passing through the pivot axis of the steering handlebar and a coronal plane passing through the pivot axis of the steering handlebar are defined; when the armrest handlebar is projected onto the coronal plane, the curved surface of each of the leaned segment of the two extending tubes has an inner extreme point and an outer extreme point on the coronal plane, wherein the inner extreme point is closer to the sagittal plane than the outer extreme point, and the inner extreme point is lower than the outer extreme point.

10. The armrest handlebar of claim 9, wherein a distance between the inner extreme point and the outer extreme point is greater than or equal to 2 cm and is smaller than or equal to 6 cm.

11. The armrest handlebar of claim 10, wherein the distance between the inner extreme point and the outer extreme point is greater than or equal to 3 cm and is smaller than or equal to 5 cm.

12. A bicycle handlebar assembly, comprising:
    a steering handlebar which is adapted to be pivotally engaged with a frame of a bicycle;
    an armrest handlebar comprising two extending tubes connected to the steering handlebar, wherein each of the two extending tubes comprises a combining segment, a lifting segment, a leaned segment, and a holding segment which are sequentially disposed; the combining segment has a base axis and is connected to the steering handlebar; the lifting segment is connected to the combining segment at an elevation angle; the leaned segment is connected to the lifting segment; the holding segment is adapted to be held by a rider; a top surface of each of the leaned segments is recessed to form a curved surface adapted to be leaned on by a forearm of the rider;
    two armrest pads which are engaged with the steering handlebar, wherein each of the armrest pads has a concave surface;
    wherein a sagittal plane passing through the pivot axis of the steering handlebar and a coronal plane passing through the pivot axis of the steering handlebar are defined; when the armrest handlebar is projected onto the coronal plane, the curved surface of each of the leaned segments of the two extending tubes has an inner extreme point and an outer extreme point on the coronal plane; the inner extreme point is lower than the outer extreme point; the inner extreme point is closer to the sagittal plane than the outer extreme point; when the armrest handlebar is projected onto the coronal plane, the concave surface of each of the two armrest pads has a near side extreme point and a far side extreme point on the coronal plane; the near side extreme point is closer to the sagittal plane than the far side extreme point; a first extending line passes through the inner extreme point and the outer extreme point; a second extending line passes through the near side extreme point and the far side extreme point; an angle formed between the first extending line and the second extending line is an acute angle.

13. The bicycle handlebar assembly of claim 12, wherein the angle formed between the first extending line and the second extending line is greater than 0 degree and is smaller or equal to 45 degrees.

14. The bicycle handlebar assembly of claim 13, wherein the angle formed between the first extending line and the second extending line is greater than 0 degrees and is smaller or equal to 30 degrees.

15. The bicycle handlebar assembly of claim 14, wherein the angle formed between the first extending line and the second extending line is greater than 0 degrees and is smaller or equal to 15 degrees.

16. The bicycle handlebar assembly of claim 12, wherein the second extending line is parallel to the base axis.

17. The bicycle handlebar assembly of claim 12, wherein the lifting segment has a first center axis; the leaned segment has a second center axis; the holding segment has a third center axis; the first center axis intersects with the second center axis at a second node; the second center axis intersects with the third center axis at a third node; a length between the second node and the third node is greater than or equal to 5 cm and is smaller than or equal to 20 cm.

18. The bicycle handlebar assembly of claim 17, wherein the length between the second node and the third node is greater than or equal to 8 cm and is smaller than or equal to 16 cm.

19. The bicycle handlebar assembly of claim 12, wherein a distance between the inner extreme point and the outer extreme point is greater than or equal to 2 cm and is smaller than or equal to 6 cm.

20. The bicycle handlebar assembly of claim 19, wherein the distance between the inner extreme point and the outer extreme point is greater than or equal to 3 cm and is smaller than or equal to 5 cm.

21. An armrest handlebar which is adapted to be engaged with a steering handlebar of a bicycle, wherein the steering handlebar is pivotable to pivot around a pivot axis; the armrest handlebar comprises:
two extending tubes, and each of the two extending tubes comprises a combining segment, a lifting segment, a leaned segment, and a holding segment which are sequentially disposed, wherein the combining segment has a base axis and is adapted to be connected to the steering handlebar; the holding segment is adapted to be held by a hand of a rider; the lifting segment has a first center axis; the leaned segment has a second center axis; the holding segment has a third center axis; a first angle is formed between the first center axis and the base axis; a second angle is formed between the second center axis and the base axis, wherein the first angle is greater than the second angle;
wherein a top surface of each of the leaned segments of the two extending tubes is recessed to form a curved surface adapted to be leaned on by a forearm of the rider.

22. The armrest handlebar of claim 21, wherein the base axis intersects with the first center axis at a first node; the first center axis intersects with the second center axis at a second node; the second center axis intersects with the third center axis at a third node.

23. The armrest handlebar of claim 22, wherein a sagittal plane passing through the pivot axis of the steering handlebar is defined; each of the holding segments of the two extending tubes has a free end; a distance between the free end and the sagittal plane is smaller than a distance between the third node and the sagittal plane.

24. The armrest handlebar of claim 23, wherein the third center axis passes through the third node and the free end; an elevation angle is formed between the third center axis and the second center axis and is greater than 0 degrees and is smaller than or equal to 90 degrees.

25. The armrest handlebar of claim 21, wherein each of the holding segments comprises a bending portion and an extending portion; the bending portion has a fourth center axis; a depression angle is formed between the fourth center axis and the second center axis and is an acute angle.

26. The armrest handlebar of claim 25, wherein the depression angle is greater than 0 degrees and is smaller than or equal to 60 degrees.

27. The armrest handlebar of claim 26, wherein the fourth center axis intersects with the second center axis at a fifth node; the fourth center axis intersects with the base axis at a fourth node, and a distance between the fourth node and the fifth node is smaller than or equal to 10 cm.

28. The armrest handlebar of claim 21, wherein a sagittal plane passing through the pivot axis of the steering handlebar and a coronal plane passing through the pivot axis of the steering handlebar are defined; when the armrest handlebar is projected onto the coronal plane, the curved surface of each of the leaned segment of the two extending tubes has an inner extreme point and an outer extreme point on the coronal plane, wherein the inner extreme point is closer to the sagittal plane than the outer extreme point, and the inner extreme point is lower than the outer extreme point.

29. The armrest handlebar of claim 28, wherein a distance between the inner extreme point and the outer extreme point is greater than or equal to 2 cm and is smaller than or equal to 6 cm.

30. The armrest handlebar of claim 29, wherein the distance between the inner extreme point and the outer extreme point is greater than or equal to 3 cm and is smaller than or equal to 5 cm.

* * * * *